(12) United States Patent
Tulloch

(10) Patent No.: US 12,145,739 B2
(45) Date of Patent: Nov. 19, 2024

(54) WINGBOX WITH FUEL TANK ATTACHED TO RIBS

(71) Applicant: Airbus Operations Limited, Bristol (GB)

(72) Inventor: William Tulloch, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 17/652,374

(22) Filed: Feb. 24, 2022

(65) Prior Publication Data

US 2022/0266980 A1 Aug. 25, 2022

(30) Foreign Application Priority Data

Feb. 25, 2021 (GB) ...................................... 2102725

(51) Int. Cl.
  *B64D 37/04* (2006.01)
  *B64C 3/18* (2006.01)
  *B64D 37/30* (2006.01)

(52) U.S. Cl.
  CPC .............. *B64D 37/04* (2013.01); *B64C 3/185* (2013.01); *B64C 3/187* (2013.01); *B64D 37/30* (2013.01)

(58) Field of Classification Search
  CPC ........... B64C 3/34; B64C 3/185; B64C 3/186; B64C 37/08; B64C 37/04; B64C 37/02; B64D 37/06
  See application file for complete search history.

(56) References Cited

U.S. PATENT DOCUMENTS

| | | | |
|---|---|---|---|
| 7,806,365 B2 | 10/2010 | Miller et al. | |
| 7,871,042 B2 | 1/2011 | Velicki et al. | |
| 9,493,246 B2 | 11/2016 | Barmichev et al. | |
| 2010/0037998 A1* | 2/2010 | Bray | B64C 3/26 148/695 |
| 2015/0069184 A1* | 3/2015 | Barmichev | B64D 37/30 244/135 R |
| 2017/0008645 A1* | 1/2017 | Pham | B64F 5/10 |
| 2018/0009525 A1 | 1/2018 | Keegan et al. | |

(Continued)

FOREIGN PATENT DOCUMENTS

| | | |
|---|---|---|
| CN | 205615721 | 10/2016 |
| CN | 106628114 A * | 5/2017 |
| CN | 207631504 | 7/2018 |

(Continued)

OTHER PUBLICATIONS

Combined Search and Examination Report for GB2102725.5 dated Aug. 17, 2021, 8 pages.

*Primary Examiner* — Philip J Bonzell
*Assistant Examiner* — Anna L. Gordon
(74) *Attorney, Agent, or Firm* — Nixon & Vanderhye P.C.

(57) ABSTRACT

An aircraft wingbox assembly is disclosed having a wingbox including an upper cover, a lower cover and a pair of spars; a plurality of ribs in the wingbox, wherein the ribs divide the wingbox into bays; and a fuel tank in the wingbox. All or part of the fuel tank is located in a first one of the bays between a first one of the ribs and a second one of the ribs. The fuel tank includes a tank wall and first and second tank lugs extending from the fuel tank wall. A first fastener attaches the first tank lug to the first one of the ribs; and a second fastener attaches the second tank lug to the second one of the ribs.

19 Claims, 10 Drawing Sheets

(56) References Cited

U.S. PATENT DOCUMENTS

2022/0289401 A1* 9/2022 Heck ................. B64D 37/06

FOREIGN PATENT DOCUMENTS

| CN | 106628114 | | 6/2020 | | |
|---|---|---|---|---|---|
| CN | 212951088 | | 4/2021 | | |
| DE | 10 2015 008 178 | | 2/2017 | | |
| DE | 102015008178 | A1 * | 2/2017 | | |
| EP | 2639152 | A2 * | 9/2013 | ............. | B64C 3/185 |
| FR | 3001714 | A1 * | 8/2014 | ............. | B64D 37/04 |
| GB | 582704 | | 11/1946 | | |

* cited by examiner

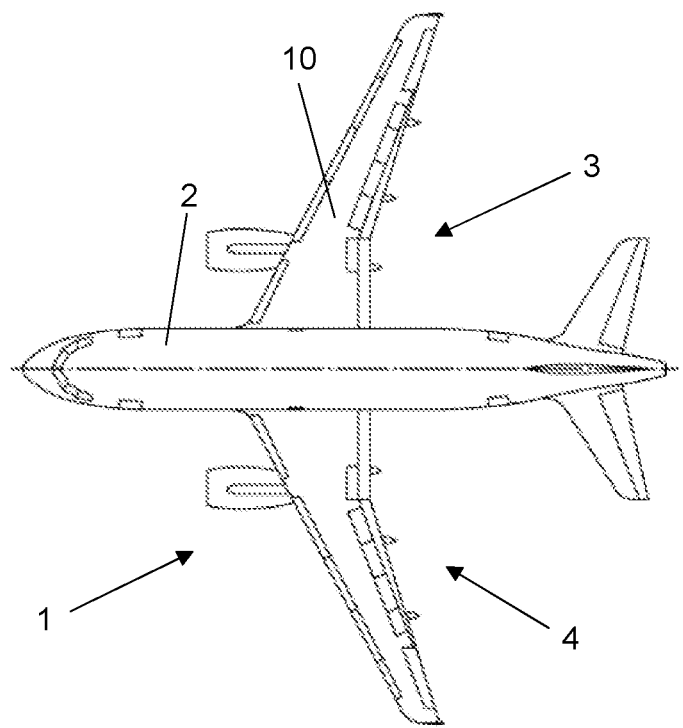
FIG. 1
FIG. 2
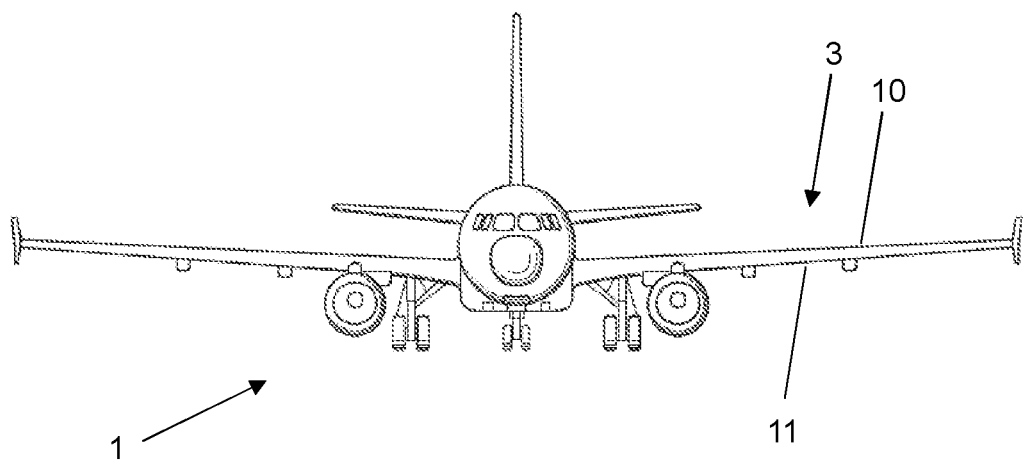

WINGBOX WITH FUEL TANK ATTACHED TO RIBS

CROSS RELATED APPLICATION

This application claims priority to United Kingdom Patent Application GB2102725.5, filed Feb. 25, 2021, the entire contents of which is hereby incorporated by reference.

FIELD OF THE INVENTION

The present invention relates to an aircraft wingbox assembly with a fuel tank attached to ribs in the wingbox; and a method of assembling such an assembly.

BACKGROUND OF THE INVENTION

Cryogenic fuels tanks for use in aircraft structures are disclosed in U.S. Pat. No. 9,493,246. In some examples, one or more fuel tanks form a fuel tank bundle. For example, the fuel tank bundle may include rows, columns and/or any other arrangement and/or array of fuel tanks. The fuel tank bundle may be a load bearing component of the aircraft structure.

SUMMARY OF THE INVENTION

A first aspect of the invention provides an aircraft wingbox assembly comprising: a wingbox comprising an upper cover, a lower cover and a pair of spars; a plurality of ribs in the wingbox, wherein the ribs divide the wingbox into bays; a fuel tank in the wingbox, wherein all or part of the fuel tank is located in a first one of the bays between a first one of the ribs and a second one of the ribs, the fuel tank comprising a tank wall and first and second tank lugs extending from the fuel tank wall; a first fastener attaching the first tank lug to the first one of the ribs; and a second fastener attaching the second tank lug to the second one of the ribs.

Optionally the first or second one of the ribs comprises a rib hole, and the rib hole and the fuel tank are configured to enable one or both of the tank lugs to pass through the rib hole.

Optionally the rib hole and the fuel tank are configured to enable both of the tank lugs to pass through the rib hole.

Optionally the fuel tank extends through the first one of the ribs and the second one of the ribs; a first part of the fuel tank is located in the first one of the bays; a second part of the fuel tank is located in a second one of the bays; and a third part of the fuel tank is located in a third one of the bays.

Optionally the tank wall extends continuously through the first, second and third ones of the bays.

Optionally each of the ribs comprises a rib web, and rib feet attaching the rib to the covers; the first tank lug is attached to the rib web of the first one of the ribs or to a rib foot of the first one of the ribs; and the second tank lug is attached to the rib web of the second one of the ribs or to a rib foot of the second one of the ribs.

Optionally the first one of the ribs comprises a first rib lug; the second one of the ribs comprises a second rib lug; the first fastener attaches the first tank lug to the first rib lug; and the second fastener attaches the second tank lug to the second rib lug.

Optionally a lower half of the fuel tank carries the tank lugs and an upper half of the fuel tank is free of tank lugs and preferably free of other attachment features.

In some embodiments the first and second tank lugs are spaced apart along a length of the fuel tank, and in other embodiments the first and second tank lugs are spaced apart across a width of the fuel tank.

Optionally the fuel tank is a hydrogen fuel tank.

Optionally the fuel tank contains a fuel which is a pressurised gas or a cryogenically cooled liquid.

Optionally the tank lugs are retractable.

Optionally the spars extend in a spanwise direction; and the bays are spaced apart in the spanwise direction.

Optionally the fuel tank wall is rigid.

A further aspect of the invention provides a method of assembling an aircraft wingbox assembly according to the first aspect, the method comprising: installing the fuel tank so that at least part of the fuel tank is located in the first one of the bays; attaching the first one of the tank lugs to the first one of the ribs with the first fastener; and attaching the second one of the tank lugs to the second one of the ribs with the second fastener.

Optionally, during the installing, the tank lugs are carried by the fuel tank wall.

Optionally, during the installing, one or both of the tank lugs passes through the first one of the ribs and/or through the second one of the ribs.

Optionally, during the installing, the fuel tank passes through the first one of the ribs and/or through the second one of the ribs.

Optionally, during the installing, the fuel tank passes through the first one of the ribs, through the second one of the ribs, and through one or more further ones of the ribs.

Optionally the fuel tank has a length, and during the installing, the fuel tank is moved along its length, and then rotated or moved laterally to bring the tank lugs to fastening positions.

BRIEF DESCRIPTION OF THE DRAWINGS

Embodiments of the invention will now be described with reference to the accompanying drawings, in which:

FIG. 1 is a plan view of an aircraft;

FIG. 2 is a front view of the aircraft of FIG. 1;

DETAILED DESCRIPTION OF EMBODIMENT(S)

Figure 3:
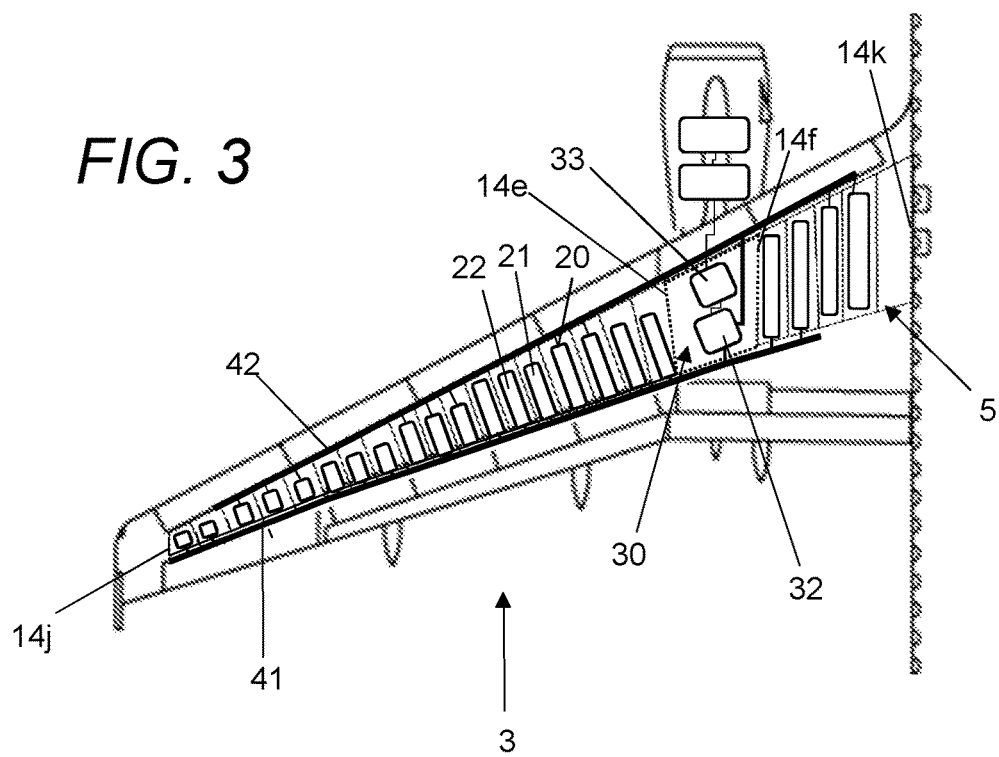
FIG. 3 is a plan view of the port wing showing various internal components.

An aircraft 1 is shown in FIGS. 1 and 2 and comprises a fuselage 2 and a pair of wings 3, 4. Each wing comprises a wingbox assembly 5 shown in FIG. 7. The wingbox assembly 5 comprises a wingbox with an upper cover 10, a lower cover 11, and a pair of spars (front spar 12 and rear spar 13).

Figure 4A:
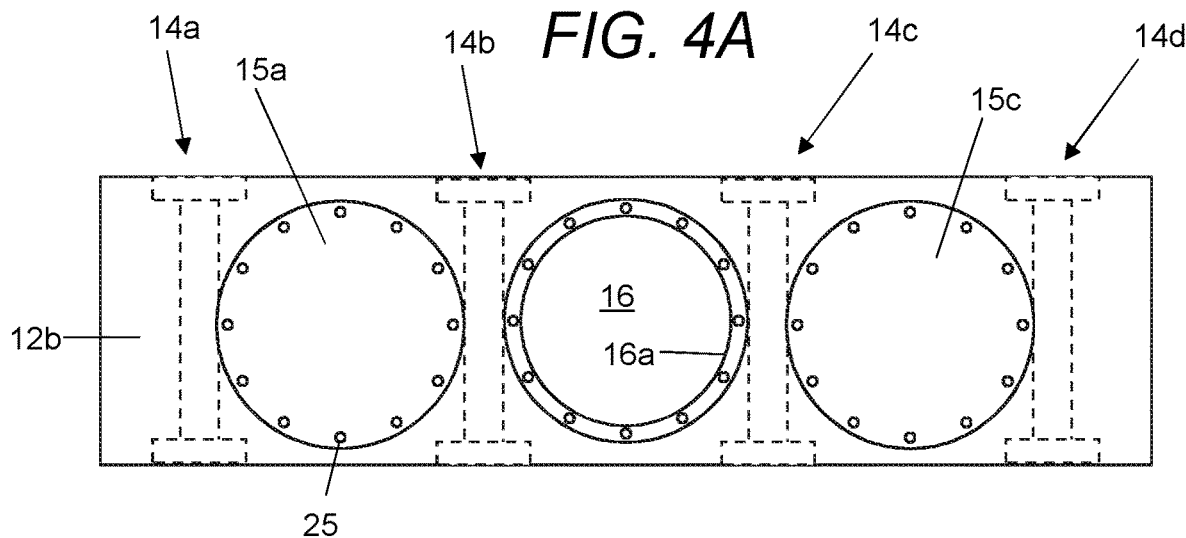
FIG. 4A is a front view of part of the wingbox with a door removed.
Figure 4B:
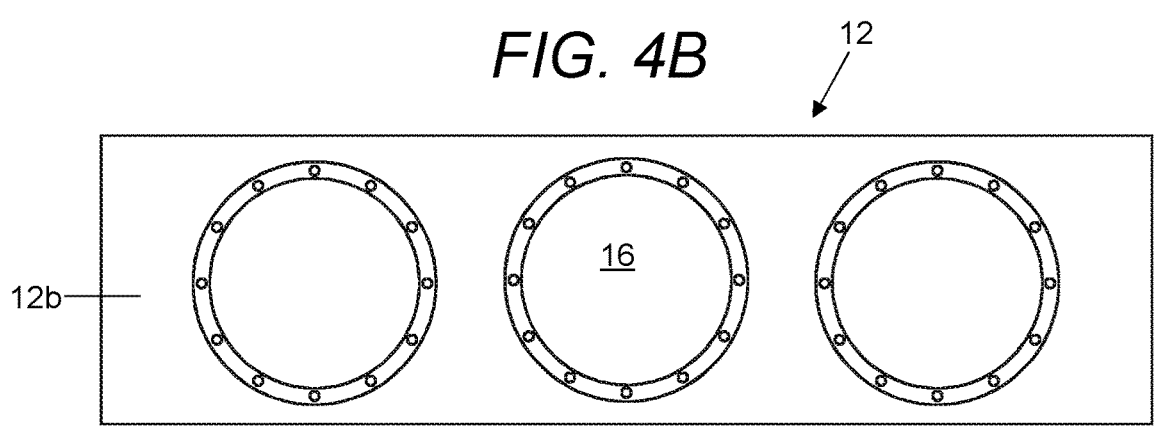
FIG. 4B is a front view of part of the front spar with all doors removed.

FIG. 3 is a plan view of the port wing 3 with various internal parts shown. FIGS. 4A and 4B show part of the front spar 12.

The wingbox assembly 5 includes a plurality of ribs in the wingbox which extend in a chordwise direction and divide the wingbox into bays. The ribs and the bays are spaced apart in a spanwise direction along the wing 3.

In this example there are twenty six ribs and twenty four bays, although the number of ribs may vary. The ribs include an inboard rib 14k at the root of the wingbox, an outboard rib 14j at the tip of the wingbox and twenty four intermediate ribs, four of which are shown in FIG. 4A and labelled 14a-d. Each of the ribs is attached to both of the covers 10, 11 and to both of the spars 12, 13.

The wingbox assembly 5 also has twenty two cylindrical hydrogen fuel tanks which are located inside the wingbox. The fuel tanks may contain pressurised hydrogen gas, or cryogenically cooled hydrogen liquid. The number of fuel tanks may vary.

Figure 5:
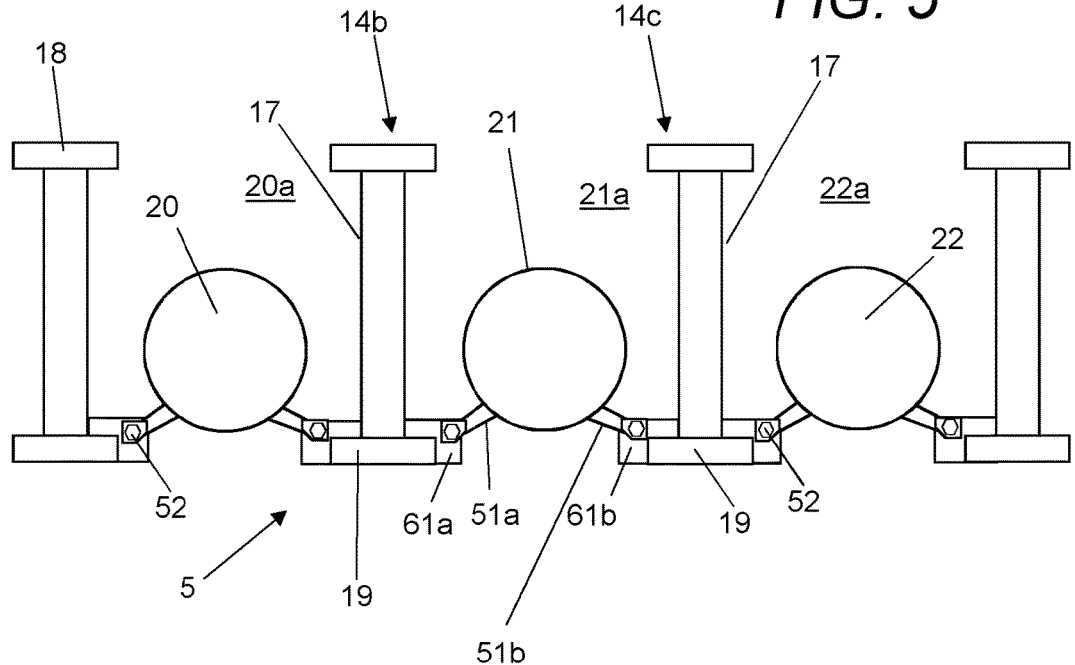
FIG. 5 is a front view of part of the wingbox assembly showing three exemplary fuel tanks.

FIG. 5 show a front view of part of the wingbox assembly 5, with the front spar 12 and the covers 10, 11 omitted for clarity, and showing three exemplary fuel tanks 20, 21 and 22. In this example, each fuel tank 20, 21, 22 is located inside a respective bay 20a, 21a, 22a between a respective pair of ribs. For example a first one of the bays 21a is between a first one of the ribs 14b and a second one of the ribs 14c.

The spars 12, 13 are spaced apart in a chordwise direction, and a length of each fuel tank extends in the chordwise direction.

In this case, only one fuel tank is housed in each bay, but in other embodiments each bay may have two or more fuel tanks.

While the wingbox assembly 5 is shown in this example with multiple fuel tanks, in an alternate embodiment, the wingbox assembly 5 may only house a single fuel tank.

The fuel tanks in this example are hydrogen fuel tanks. Referring to FIG. 3, a fuel cell system 30 is also located inside the wingbox, in a bay between a pair of ribs 14e, 14f. The fuel cell system 30 comprises a fuel cell 32 and a battery 33.

The fuel cell 32 is an electrochemical cell (or stack of cells) which converts chemical energy of the hydrogen fuel into electrical energy which is stored in the battery 33.

The battery 33 supplies electrical power to a propulsion system suspended under the wingbox.

A first fuel line 41 is located behind the rear spar 13 and is configured to deliver hydrogen fuel from twelve of the fuel tanks to the fuel cell system 30. A second fuel line 42 is located in front of the front spar 12 and is configured to deliver hydrogen fuel from the other ten fuel tanks to the fuel cell system 30. The use of two fuel lines 41, 42 provides an element of redundancy to the system.

In this example, the fuel tanks 21, 22 are connected to the first fuel line 41 which runs behind the rear spar 13, and the fuel tank 20 is connected to the second fuel line 42 which runs in front of the front spar 12.

Figure 7:
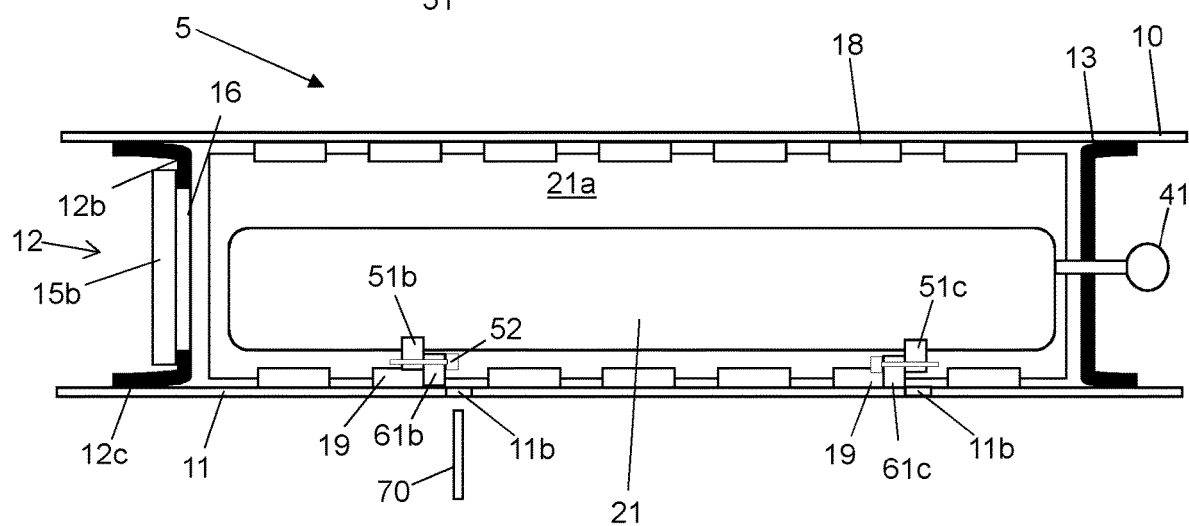
FIG. 7 is a side view of a bay with a fuel tank installed.

FIG. 4A shows a front view of the wingbox assembly 5 in greater detail. As shown in FIG. 7, the front spar 12 comprises a spar web 12b and a pair of spar flanges 12c. The spar web 12b is visible in the front views of FIGS. 4A and 4B.

The spar web 12b has a spar hole for each bay. A door 15a, 15b, 15c covers each spar hole, and fasteners 25 (such as bolts) attach each door to the spar. The fasteners 25 enable the door to act as a load-bearing element, and the fasteners 25 may be received as an interference fit.

FIG. 4B shows the front spar 12 with all of the doors removed to show the spar holes, and in FIG. 4A the door 15b covering the spar hole 16 of the central bay is removed so that the spar hole 16 is visible. Each spar hole is sized to enable a respective fuel tank to be removed from the bay through the spar hole. Each spar hole has a circular edge 16a, although in other embodiments the edge of the hole may have a different shape such as elliptical, oval, polygonal (e.g. hexagonal) etc.

Figure 6:
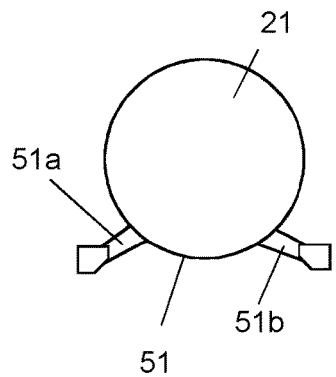
FIG. 6 is a front view of a fuel tank.

FIG. 5 is a front view of the wingbox assembly 5 showing fuel tanks 20-22 in three bays 20a-22a, with the front spar 12 and covers 10, 11 not shown. A front view of an exemplary one of the fuel tanks 21 is shown in FIG. 6.

Each fuel tank has a cylindrical tank wall 51 which carries two pairs of tank lugs extending from the tank wall 51. A front pair of tanks lugs is located at the front end of the fuel tank and can be seen in FIGS. 5 and 6. The front pair of tank lugs comprises a first tank lug 51a and a second tank lug 51b.

A rear pair of tank lugs is located at the rear end of each fuel tank. The rear pair of tank lugs is identical to the front pair of tank lugs. One of the rear pair of tank lugs is visible in FIG. 7 and labelled 51c. The other tank lug of the rear pair is not visible, but it is identical to the first tank lug 51a.

Each fuel tank may be made from a metallic material, with all parts (i.e. the tank wall 51 and the tank lugs 51a, 51b, 51c) machined from a single piece of metallic material. Alternatively the tank lugs may be attached to the tank wall 51—for instance by welding. However, more preferably each tank is made from a fibre-reinforced composite material. In this case, the tank lugs 51a, 51b, 51c may be co-bonded to the tank wall 51.

As shown in FIGS. 5 and 7, each rib comprises a rib web 17, a set of upper rib feet 18 attaching the rib to the upper cover 10, and a set of lower rib feet 19 attaching the rib to the lower cover 11. Each rib also has a pair of rib posts (not shown) which attach the front and rear edges of the rib to the front and rear spars 12, 13.

A front pair of rib lugs 61a, 61b is located at the front end of each rib. The front pair of rib lugs is visible in FIG. 5. A rear pair of rib lugs is located at the rear end of each rib. The rear pair of rib lugs is identical to the front pair of rib lugs 61a, 61b. One of the rear pair of rib lugs is visible in FIG.

7 and labelled 61c. Each rib lug 61a, 61b, 61c is attached to the rear face of a respective lower rib foot 19, and/or to the rib web 17.

Each rib may be made from a metallic material, with all parts (i.e. the web 17, the rib feet 18, 19 and the rib lugs 61a, 61b, 61c) machined from a single piece of metallic material. Alternatively the rib lugs may be attached to the rest of the rib—for instance by welding.

The lower cover 11 has an access hole 11b positioned next to each rib lug 61a, 61b, 61c.

Each tank lug secures a fuel tank to a rib via a respective one of the rib lugs. So for example the first tank lug 51a shown in FIG. 5 secures the fuel tank 21 to the first rib 14b via the rib lug 61a, and the second tank lug 51b secures the fuel tank 21 to the second rib 14c via the rib lug 61b. The lugs are connected by removable fasteners 52 (which may be bolts for example). Thus a first fastener 52 attaches the first tank lug 51a to the first one of the ribs 14b; and a second fastener 52 attaches the second tank lug 51b to the second one of the ribs 14c.

The rear pair of tank lugs at the rear end of the tank are attached to the ribs in a similar fashion. While each fuel tank in this example has two pairs of fuel tank lugs, it will be understood that optionally only one pair of fuel tank lugs may be provided per fuel tank.

During flight of the aircraft, aerodynamic effects create a bending force which tends to place the upper cover 10 in compression and the lower cover 11 in tension. This bending force urges the lower parts of the ribs away from each other, and the upper parts of the ribs towards each other. The fuel tank wall 51 and the tank lugs 51a, 51b, 51c are rigid, so by connecting the fuel tanks to the adjacent ribs via the tank lugs, a rigid structure is provided which can pick up these bending forces. The fasteners 52 are configured to enable the fuel tank to act as a load-bearing element, and the fasteners 52 may be received as an interference fit.

Providing a relative small number of tank lugs (in this case four) ensures that the resulting structure is more likely to be statically determinate.

During assembly of the wingbox assembly 5, the fuel tanks may be loaded from above and secured to the ribs before the upper cover 10 is fitted by securing it to the upper rib feet 18 and to the upper spar flanges. After a period of operation of the aircraft it may be necessary to remove one or more of the fuel tanks without first removing the upper cover 10. A method of disassembling the aircraft wing by removing the fuel tank 21 from a first one of the bays 21a through the spar hole 16 will now be described with reference to FIGS. 8 and 9.

First, a tool 70 shown in FIG. 7 is used to remove or otherwise disengage the fasteners 52 to detach the tank lugs from the ribs. The tool 70 may gain access to the fasteners 52 via the access holes 11b in the lower cover 11.

The wing 3 has leading edge structure (for instance slats, a D-nose fairing etc.) in front of the front spar 12, which is removed as a module to gain access to the front spar. The fasteners 25 are then taken out and the door 15b removed to uncover the spar hole 16 and provide access to the bay 21a.

Figure 8:
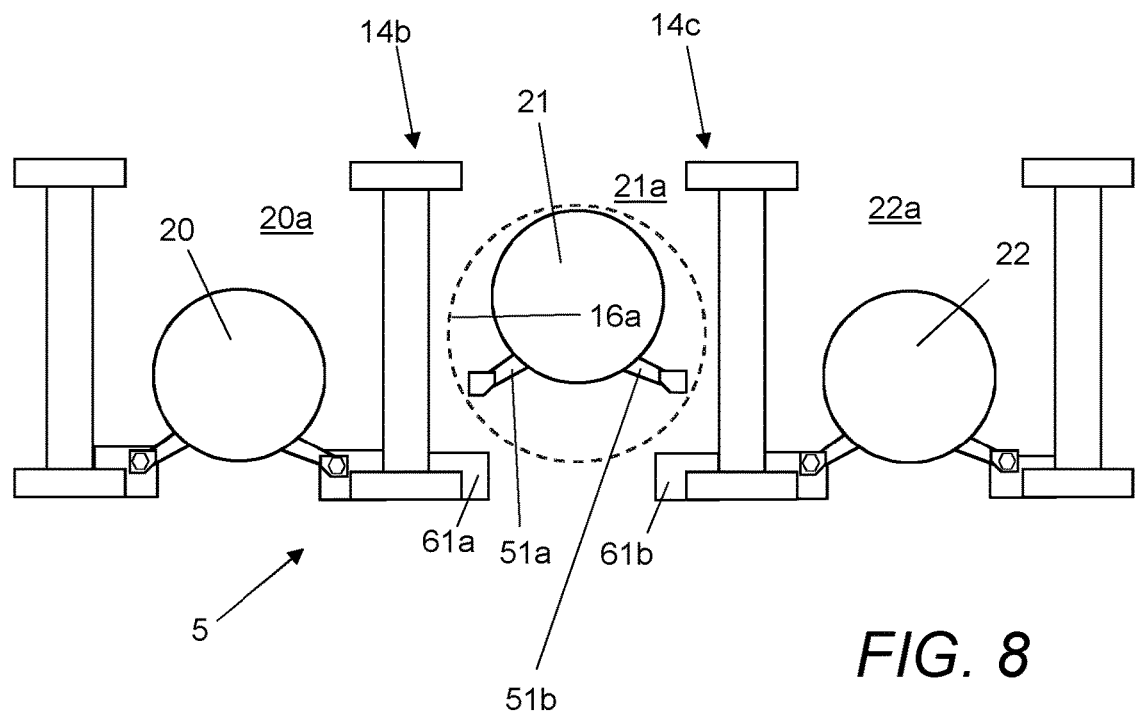
FIG. 8 is a front view showing a fuel tank raised to a removal position.
Figure 9:
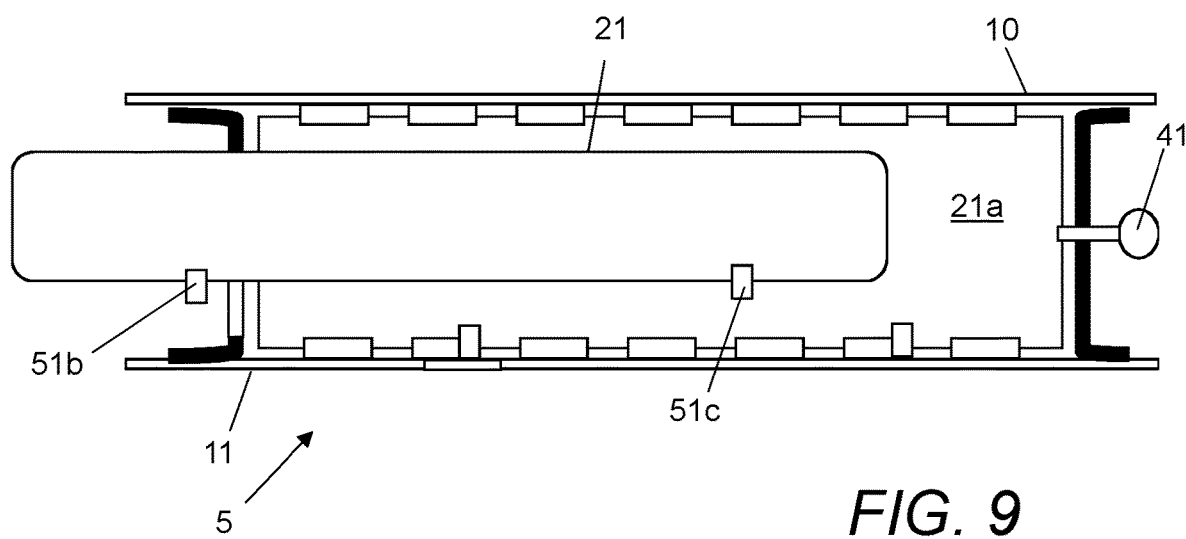
FIG. 9 is a side view showing the fuel tank of FIG. 8 being removed through a spar hole.

After the tank lugs have been detached, the fuel tank is moved laterally (in this case by lifting it up) to bring the fuel tank to a removal position shown in FIG. 8 which enables the tank lugs 51a, 51b, 51c and the tank wall 51 to fit through the spar hole 16. After the tank has been lifted up to the removal position, the fuel tank (including the tank lugs) is removed from the first one of the bays 21a through the spar hole 16.

FIG. 8 shows in dashed line the circular outline of the edge 16a of the spar hole 16. It can be seen that in this raised removal position the fuel tank 21 (including the tank lugs 51a, 51b, 51c) can be removed along its length through the spar hole 16 without clashing with the edge 16a.

After the fuel tank 21 has been removed as described above, the fuel tank 21 (or a replacement fuel tank) can be installed in the bay 21a by reversing the procedure.

In the example above, the fasteners 52 are removed by a tool 70 which gains access to the bay 21a via access holes 11b in the lower cover. In an alternative embodiment, the tool 70 may gain access into the bay 21a via the spar hole. In this case, the tool 70 must be sufficiently long to reach the fasteners 52 at the rear end of the bay. For instance the tool 70 may be a robot arm.

Figure 10A:
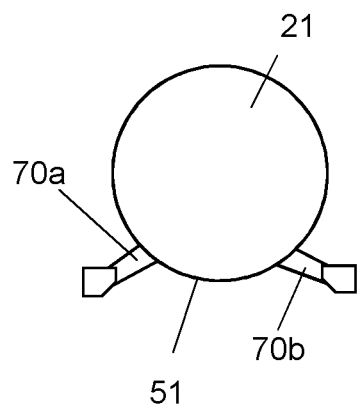
FIG. 10A is a front view of a fuel tank with retractable lugs.
Figure 10B:
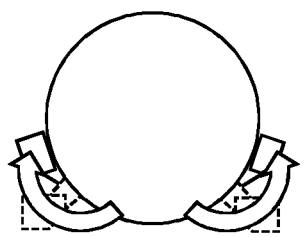
FIG. 10B shows the retractable lugs being retracted.
Figure 10C:
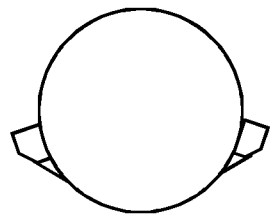
FIG. 10C shows the retractable lugs in their retracted state.
Figure 11:
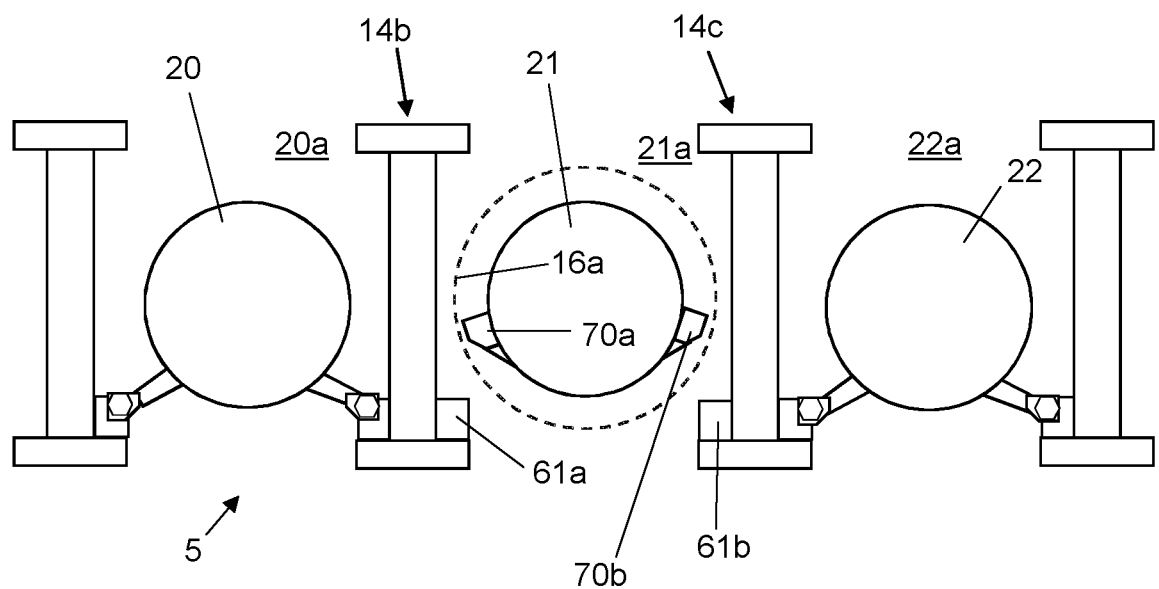
FIG. 11 shows the fuel tank of FIG. 10C with its lugs retracted ready to be removed through the spar hole.

FIGS. 10A-10C shows an alternative embodiment in which the fuel tank 21 has retractable tank lugs 70a, 70b which can be rotated (as shown in FIG. 10B) from an extended position (FIG. 10A) to a retracted position (FIG. 10C). In this case, once the tank lugs 70a, 70b are in their retracted position shown in FIG. 10B, they can fit past the edge 16a of the spar hole without having to first lift the fuel tank 21 up to a raised removal position. This is indicated in FIG. 11 which shows how the retracted lugs 70a, 70b clear the edge 16a of the spar hole.

An advantage of this arrangement is that the fuel tank 21 can be made larger in comparison with a tank with fixed tank lugs as in FIG. 8, and/or the spar hole can be made smaller. The rib lugs 61a, 61b in FIG. 11 can also be made smaller compared with the rib lugs 61a, 61b in FIG. 8.

The tank wall 51 is rigid, enabling it to contain the hydrogen fuel and also act as a structural part, reacting the wing bending forces as explained above. The rigidity of the tank wall 51 means that it cannot be collapsed before it is removed.

In this example the tank wall 51 is cylindrical (i.e. circular in cross-section) but this is not strictly essential and other tubular cross-sections can be envisaged.

The fuel tanks and the spar holes are configured to enable the tank wall 51 carrying the tank lugs to pass through the spar holes without requiring the tank wall 51 to be collapsed.

The use of tank lugs (rather than an attachment flange extending around the full periphery of the fuel tank) enables the tank to be removed without clashing with the edge of the spar hole, whilst at the same time being able to connect the tank lugs to the ribs.

In the examples described above, the fuel tanks are removed through spar holes in the front spar 12. This is preferred because the wing 3 has leading edge structure in front of the front spar 12 which is easier to remove than the trailing edge structure (flaps, spoilers etc.) behind the rear spar 13. However, in an alternative embodiment the fuel tanks may be removable through spar holes in the rear spar 13.

Figure 12:
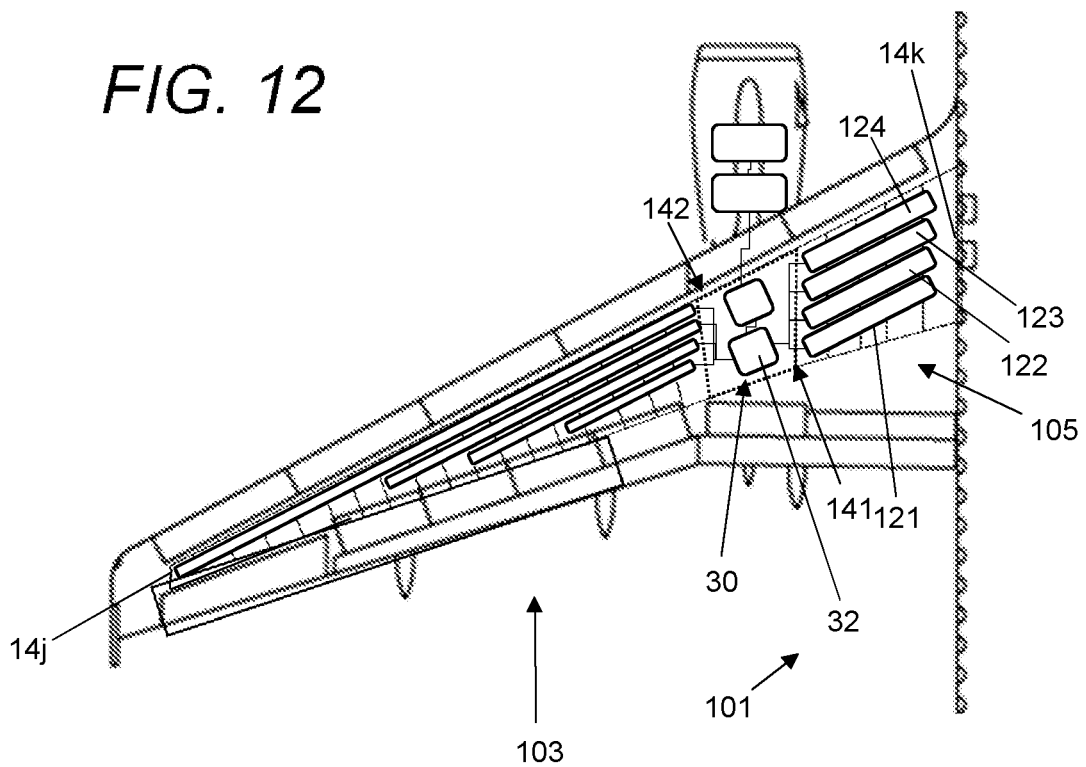
FIG. 12 shows a fuel tank arrangement with spanwise extending fuel tanks.

FIG. 12 shows an alternative fuel tank arrangement for the port wing 103 of an aircraft 101. Many of the features of the fuel tank arrangement of FIG. 12 are the same as for the previous embodiments of FIGS. 1-11. The same reference numbers are used for equivalent components which will not be described again.

The wing 103 comprises a wingbox assembly 105 shown in FIGS. 13-17. The assembly 105 comprises a wingbox with an upper cover 10, a lower cover 11 and a pair of spars 112, 13. The front spar 112 is similar to the front spar 12 but in this case it has no spar holes.

The wingbox assembly 105 includes a plurality of ribs in the wingbox which extend in a chordwise direction and divide the wingbox into bays. The ribs and the bays are spaced apart in a spanwise direction along the wing 103.

Figure 13:
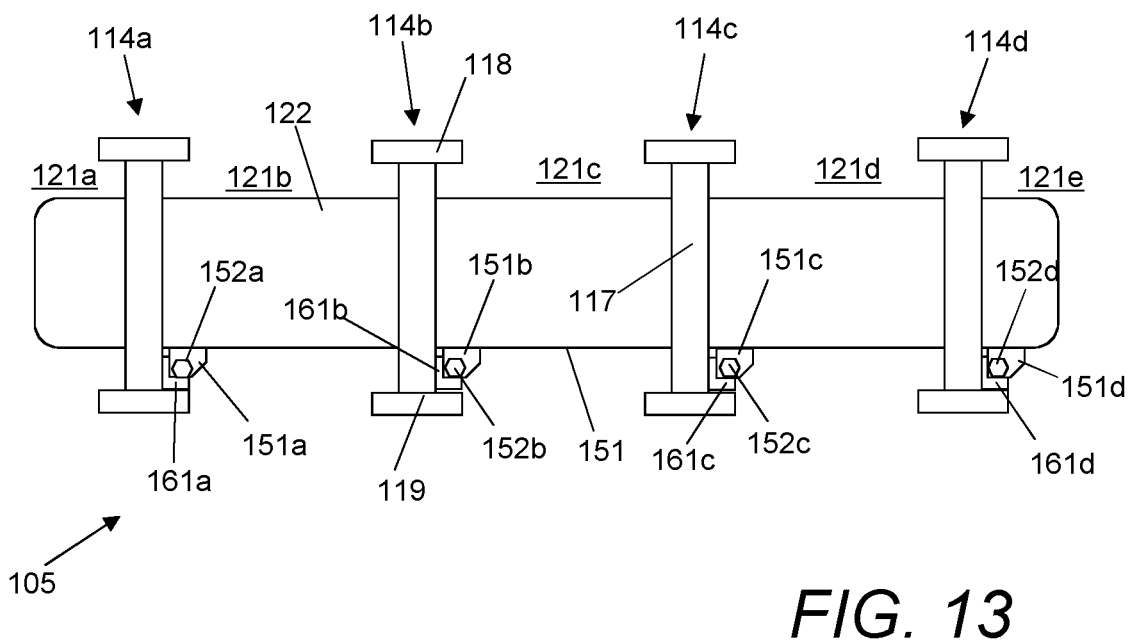
FIG. 13 shows one of the fuel tanks, viewed from the rear.

Four of the ribs are shown in FIG. 13 and labelled 114a-d. The ribs 114a-d divide the inboard end of the wingbox into five bays 121a-e. Each of the ribs is attached to both of the covers 10, 11 and to both of the spars 112, 13. For purposes of clarity the covers 10, 11 are omitted from FIGS. 13, 16 and 17; and the spars are omitted from FIGS. 16 and 17.

The wingbox assembly 105 also has eight cylindrical hydrogen fuel tanks which are located inside the wingbox. Four of the fuel tanks are housed in an inboard end of the wingbox, and four are housed in an outboard end of the wingbox.

The fuel tanks may contain pressurised hydrogen gas, or cryogenically cooled hydrogen liquid. The number of fuel tanks may vary. While the wingbox assembly 105 is shown in this example with multiple fuel tanks, in an alternate embodiment, the wingbox may only house a single fuel tank.

Each fuel tank is load bearing and certified for the safe-life of the aircraft wing.

The spars 112, 13 are spaced apart in the chordwise direction, and a length of each fuel tank extends in the spanwise direction.

FIG. 13 is a schematic view of part of the wingbox assembly 105, viewed from the rear, showing an exemplary one of the fuel tanks 122. All of the other seven fuel tanks are similar.

The fuel tanks at the inboard end of the wingbox each have a ported outboard end which is connected to the fuel cell system 30 by a fuel line network 141, and the fuel tanks at the outboard end of the wingbox 105 each have a ported inboard end which is connected to the fuel cell system 30 by a fuel line network 142. The use of two fuel line networks 141, 142 provides an element of redundancy to the system.

Each fuel tank has a cylindrical tank wall 151 which carries four tank lugs 151a-d extending down from the bottom of the tank wall 151. The tank lugs 151a-d of each tank are spaced apart along the length of the fuel tank, i.e. in the spanwise direction of the wing.

Each fuel tank may be made from a metallic material, with all parts (i.e. the tank wall 151 and the tank lugs 151a-d) machined from a single piece of metallic material, or integrally formed in some other way. Alternatively the tank lugs 151a-d may be attached to the tank wall 151—for instance by welding. However, more preferably each tank is made from a fibre-reinforced composite material. In this case, the tank lugs 151a-d may be co-bonded to the tank wall 151.

In this example the tank wall 151 is cylindrical (i.e. circular in cross-section) but this is not strictly essential and other generally tubular cross-sections can be envisaged.

Each rib comprises a rib web 117, a set of upper rib feet 118 attaching the rib to the upper cover 10, and a set of lower rib feet 119 attaching the rib to the lower cover 11. Each rib also has a pair of rib posts (not shown) which attach the front and rear edges of the rib to the front and rear spars 112, 13.

Figure 14:
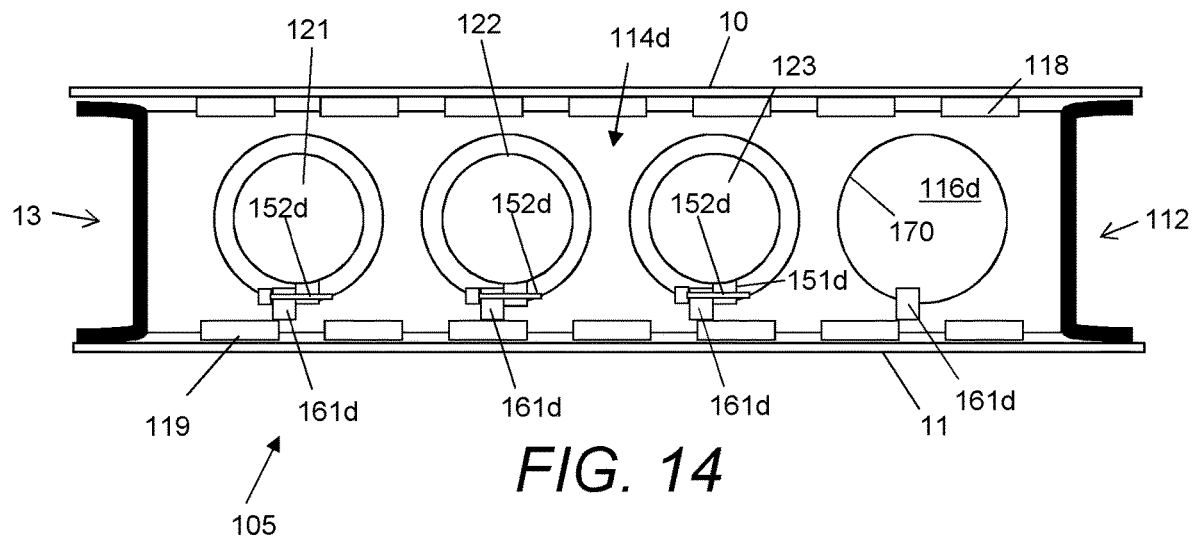
FIG. 14 shows the wingbox assembly, viewed from an inboard direction with one of the fuel tanks not yet installed.

Each rib has four rib lugs. For example, FIG. 14 shows the four rib lugs 161d of the rib 114d. Each rib lug is attached to the inboard face of a respective rib web 117 and/or to a respective lower rib foot 119.

FIG. 13 shows only one rib lug of each of the ribs, labelled 161a-d. FIG. 14 shows all four rib lugs 161d of the inboard one of the ribs 114d.

Each rib may be made from a metallic material, with all parts (i.e. the web 117, the rib feet 118, 119 and the rib lugs 161a-d) machined from a single piece of metallic material.

Alternatively the rib lugs 161a-d may be attached to the rest of the rib—for instance by welding.

The fuel tanks pass through rib holes in the rib webs 117. An exemplary one of the rib holes 116d is shown in FIG. 14, which shows the wingbox 105 before the fuel tank 124 has been installed, so the entirety of the rib hole 116d can be seen. Each rib hole has a circular edge 170.

The fuel tank 122 extends through rib holes in the four ribs shown in FIG. 13. Thus the first one of the ribs 114b comprises a first rib hole (not shown); the second one of the ribs 114c comprises a second rib hole (not shown); a third (outboard) one of the ribs 114a comprises a third rib hole (not shown); and a fourth (inboard) one of the ribs 114d comprises a fourth rib hole (not shown). The fuel tank 122 extends through all four of these rib holes.

In the example of FIG. 13, the tank wall 151 extends continuously (i.e. without joints) through three bays 121b-d, and terminates in the bays 121a, 121e at either end.

As shown in FIG. 13, a first (central) part of the fuel tank 122 is located in a first one of the bays 121c between a first one of the ribs 114b and a second one of the ribs 114c. A second part (outboard) of the fuel tank is located in a second one of the bays 121b. A third (inboard) part of the fuel tank is located in a third one of the bays 121d. The ported outboard end of the fuel tank 122 is located in a fourth one of the bays 121a. The closed and unported inboard end of the fuel tank 122 is located in a fifth one of the bays 121e.

The tank lugs 161a-d couple the fuel tank 122 to the ribs via the rib lugs 161a-d and removable fasteners 152a-d, which may be bolts for example.

Figure 15:
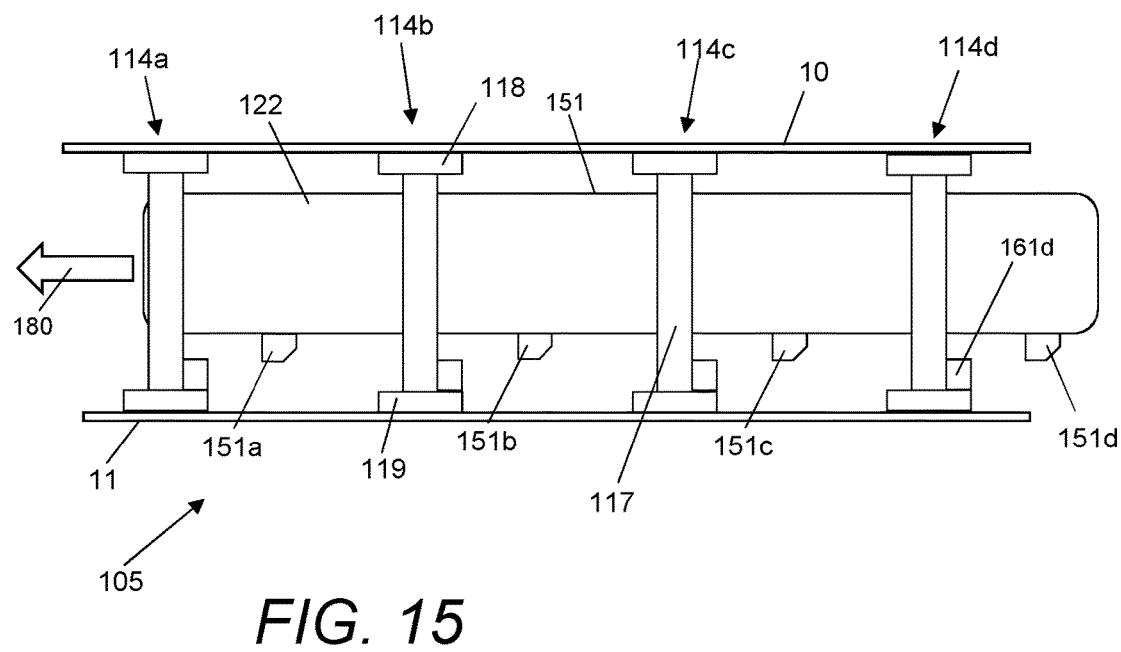
FIG. 15 shows a fuel tank being inserted through the ribs.

FIGS. 13 and 15 each show only one fastener of each of the ribs, labelled 152a-d. FIG. 14 shows three of the fasteners 152d of the inboard one of the ribs 114d, the fourth fastener being omitted because the fuel tank 124 has not yet been installed.

By way of example with reference to FIG. 13: a first fastener 152b attaches a first tank lug 151b to the first one of the ribs 114b; and a second fastener 152c attaches a second tank lug 151c to a second one of the ribs 114c, and so on.

Thus the first fastener 152b attaches the first tank lug 151b to the first rib lug 161b; the second fastener 152c attaches the second tank lug 151c to the second rib lug 161b; and so on.

The fuel tank wall 151 and the tank lugs are rigid, so by connecting the fuel tanks to the ribs via the tank lugs 151a-d, a rigid structure is provided which can pick up these bending forces. The fasteners 152a-d are configured to enable the fuel tank to act as a load-bearing element, and the fasteners 152a-d may be received as an interference fit.

Providing a relative small number of tank lugs (in this case four per fuel tank) makes it more likely that the resulting structure is statically determinate.

Figure 16:
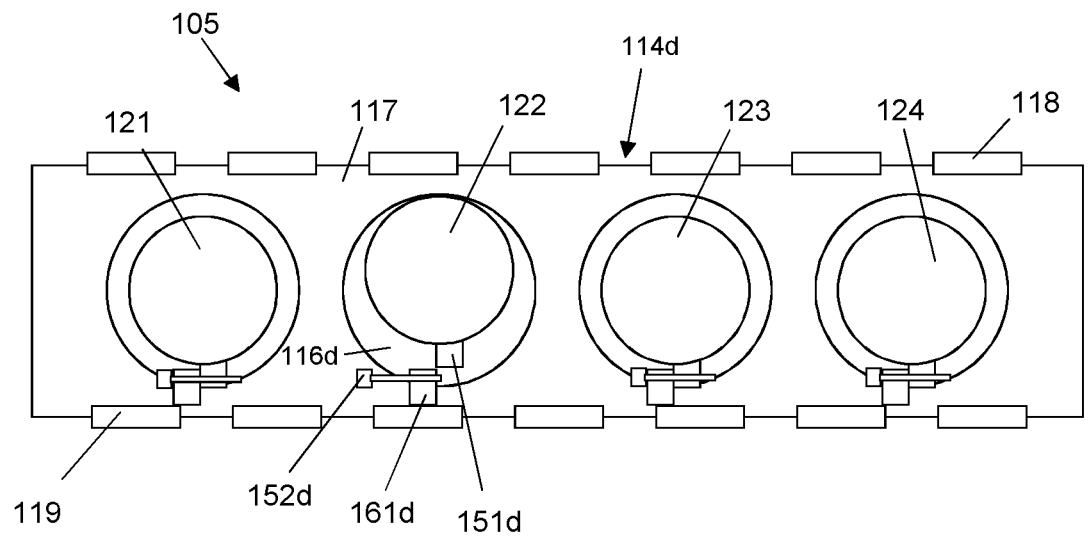
FIG. 16 shows the fuel tank in its raised position being inserted through the ribs.
Figure 17:
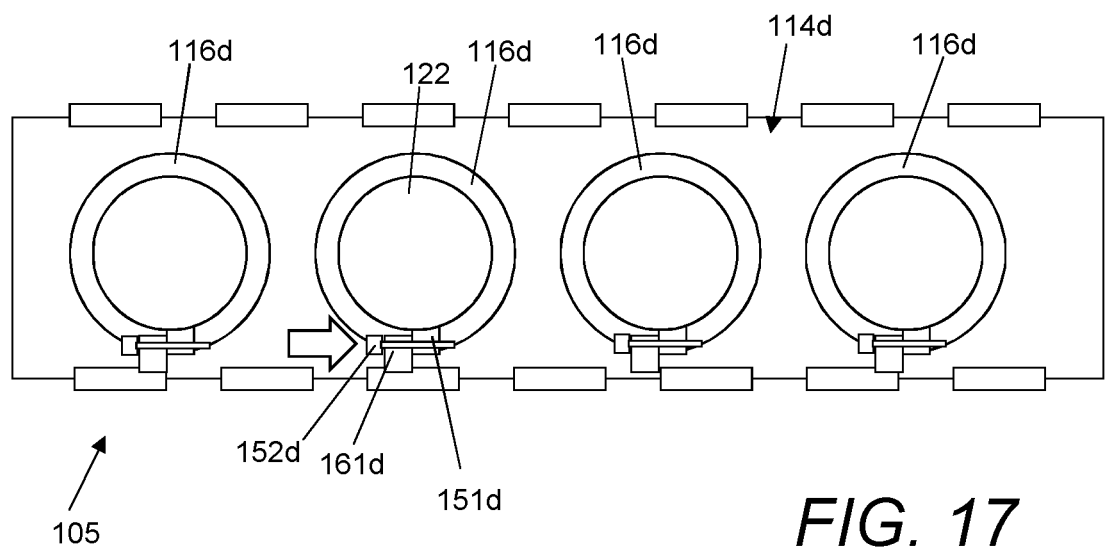
FIG. 17 shows the fuel tank of FIG. 16 in its lowered position.

FIGS. 15-17 show, by way of example, one of the fuel tanks 122 being installed.

The tank wall 151 is rigid, enabling it to contain the hydrogen fuel and also act as a structural part, reacting the wing bending forces as explained above. The rigidity of the tank wall 151 means that it cannot be installed in a collapsed state.

During the installing, the fuel tank 122 is moved along its length as indicated by arrow 180, and then moved laterally (in this case, downwards) to bring the tank lugs 151a-d to fastening positions shown in FIG. 13. FIGS. 15 and 16 show the fuel tank 122 in its raised position during installation, and FIGS. 13 and 17 show the fuel tank 122 in its lowered position after installation.

The rib hole 116d and the fuel tank 122 are configured to enable the tank wall 151 and the tank lug 151c to pass together through the rib hole 116d during installation. During the installation, the tank 122 is in its raised position so that the tank lug 151c clears the bottom edge of the rib hole 116d. The same applies to the rib holes in the other ribs. The tank lug 151a passes through three of the ribs 114b-114d during the installation, and the tank lug 151b passes through two of the ribs 114c, 114d during the installation. The outboard end of the fuel tank 122 passes through all four of the ribs 114a-d during the installation.

During the installing, the fuel tank wall 151 is not in a collapsed state. The fuel tanks and the rib holes are configured to enable the tank wall 151 carrying the tank lugs to pass through the rib holes without requiring the tank wall 151 to be collapsed.

After the tank 122 is lowered to its lowered position shown in FIG. 17, the fasteners 152a-d are inserted as shown in FIG. 17 to attach the tank lugs 151a-d to the ribs 114a-d. The ported outboard end of the fuel tank 122 is then connected to the inboard fuel line network 141.

During the installation, the fuel tank 122 may also pass through the inboard rib 14k at the root of the wingbox. Alternatively, the inboard rib 14k may have no rib hole, and it may be fitted after the fuel tanks have been installed.

The fuel tanks may installed after the upper covers 10, 11 have been fitted, or one or both of the covers 10, 11 may be fitted after the fuel tanks have been installed.

The three other fuel tanks 121, 123, 24 housed in the inboard end of the wingbox are installed in a similar way to the fuel tank 122, and the four fuel tanks housed in the outboard end of the wingbox are also installed in a similar way to the fuel tank 122, although being longer they pass through more ribs during the installation.

Figure 18:
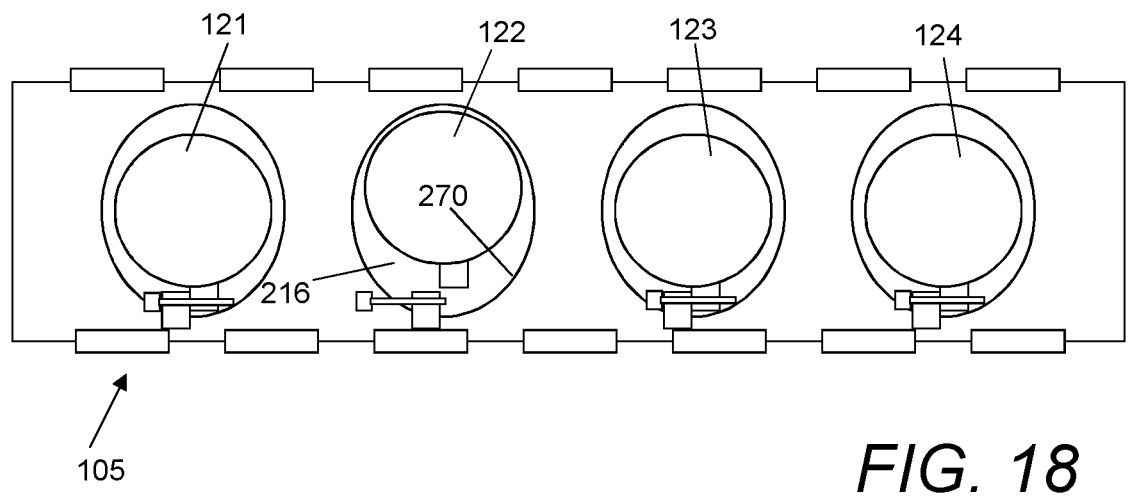
FIG. 18 shows a fuel tank being installed through an elongate rib hole.
Figure 19:
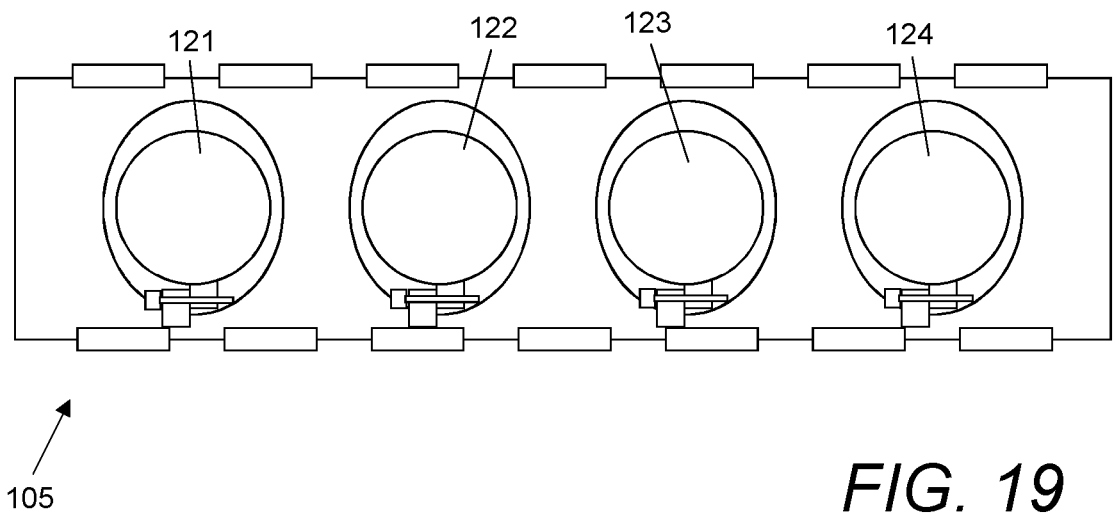
FIG. 19 shows the fuel tank of FIG. 18 in its lowered position.

In the examples above, each rib hole has a circular edge. In the alternative embodiment of FIGS. 18 and 19, each rib hole has an elongate shape—in this case a generally oval or elliptical shape—which enables the rib holes to have a reduced width whilst still enabling the rib lugs to pass through. FIG. 18 shows the fuel tank 122 being installed through a rib hole 216 with a generally oval or elliptical edge 270. FIG. 19 shows the tank 122 in its lowered position.

Figure 20:
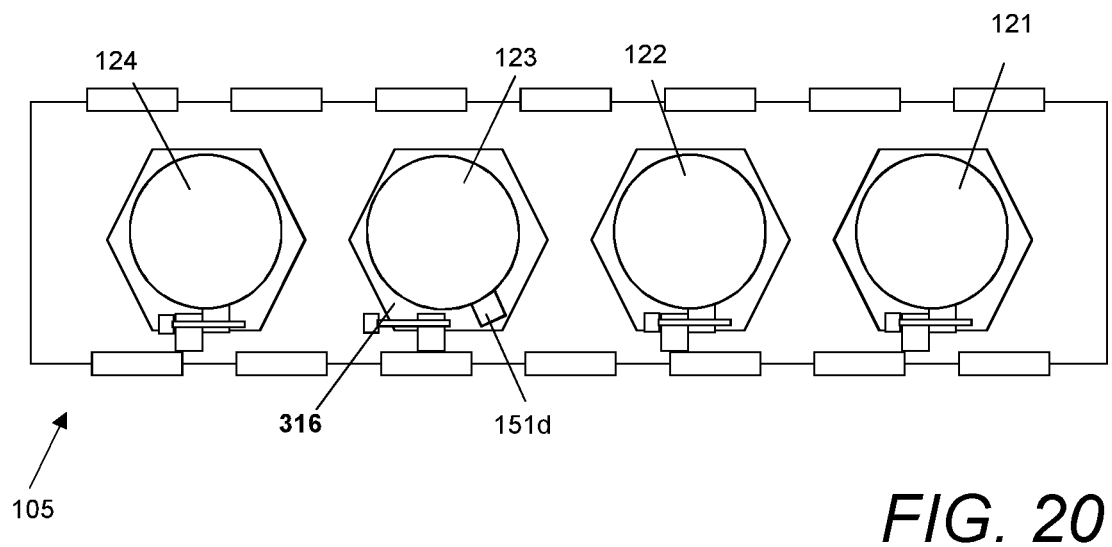
FIG. 20 shows a fuel tank being installed through a hexagonal rib hole.

In the examples above, each rib hole has a curved edge 170, 270. In the alternative embodiment of FIGS. 20 and 21, each rib hole has a polygonal shape—in this case a generally hexagonal shape—which enables the rib holes to have a reduced area whilst still enabling the rib lugs to pass through. FIG. 20 shows the fuel tank 122 being installed through a rib hole 316 with a generally hexagonal edge 370.

Figure 21:
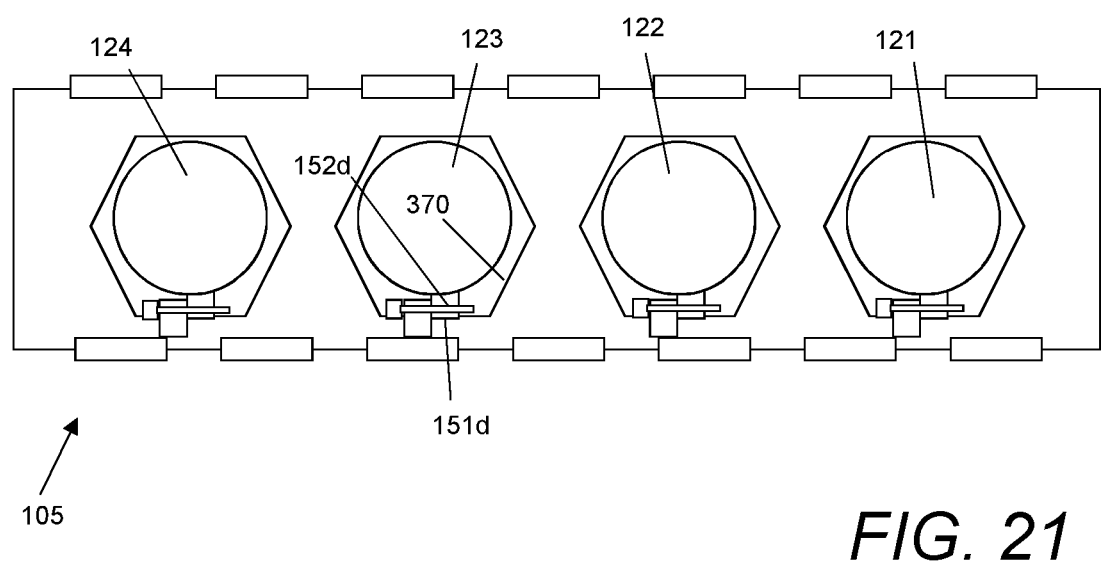
FIG. 21 shows the fuel tank of FIG. 20 in its attachment orientation.

During the installing, the fuel tank 123 is moved along its length in the orientation of FIG. 20. After the fuel tank 123 has been fully inserted, it is rotated about its length from the orientation of FIG. 20 to the orientation of FIG. 21 to bring the tank lugs 151a-d to fastening positions in which the tank lugs engage with the rib lugs, enabling the fasteners 152d to be inserted as shown in FIG. 21.

The use of tank lugs (rather than an attachment flange extending around the full periphery of the fuel tank) enables the tank 122, 123 etc. to be installed without clashing with the edges of the rib holes, whilst at the same time being able to connect the tank lugs to the ribs.

In the examples of FIGS. 12-21, the tank lugs are fixed relative to the tank wall 151. In other embodiments, the tank lugs may be retractable, like the retractable tank lugs 70a, 70b, to enable them to be fitted through the rib holes in a retracted state.

The following comments apply to all of the embodiments described above with reference to FIGS. 1-21.

The fuel tanks 21, 22; 121, 122 etc. may be hydrogen fuel tanks, but in other examples the fuel tanks may be configured to contain any other fuel. Typically the fuel tanks contain a fuel which can be used by a fuel cell to convert chemical energy into electrical energy. Typically each fuel tank contains a fuel which is a pressurised gas or a cryogenically cooled liquid.

Each tank lug 51a-c; 151a-d may be attached at an attachment location which is closer to the lower cover 11 than to the upper cover 10. A lower half of the fuel tank 21, 122 may carry the tank lugs and an upper half of the fuel tank 21, 122 may be free of tank lugs or other attachment features. This is preferred because it makes the tank lugs easier to reach from below during installation or removal, and provides the necessary stiffening effect on the lower cover.

The tank lugs 151a-c; 151a-d may extend laterally relative to a length of the fuel tank—in other words the tank lugs typically do not extend in the longitudinal direction of the fuel tank.

The tank lugs 51a, 51b; 151a-d may be configured to carry wing bending load caused by bending of the wingbox. Optionally the tank lugs may also carry other loads such as Brazier loads.

The fuel tank wall 51, 151 may be generally tubular. The cross-section of the fuel tank wall may be circular, oval, elliptical, polygonal or any other shape.

The fuel tank wall 51, 151 may be rigid, typically made from a metal or composite material.

In the embodiments of FIGS. 1-11, all of the fuel tank 21 is located in a first one of the bays 21a between a first one of the ribs 14b and a second one of the ribs 14c. In the embodiments of FIGS. 12-21, only part of the fuel tank 122 is located in a first one of the bays 121c between a first one of the ribs 114b and a second one of the ribs 114c. Other parts of the fuel tank 122 may be located in adjacent bays.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wingbox assembly, comprising:
a wingbox comprising an upper cover, a lower cover and a pair of spars;
a plurality of ribs in the wingbox,
wherein the plurality of ribs divide the wingbox into bays;
a fuel tank in the wingbox, wherein all or part of the fuel tank is located in a first one of the bays between a first one of the ribs and a second one of the ribs,
the fuel tank comprising a tank wall and first and second tank lugs extending from the fuel tank wall,
wherein the first tank lug is located in the first one of the bays between the first one of the ribs and the second one of the ribs;
a first fastener attaching the first tank lug to the first one of the ribs;
a second fastener attaching the second tank lug to the second one of the ribs; and
wherein the first or second one of the ribs comprises a rib hole, and the rib hole and the fuel tank are configured to enable one or both of the first and second tank lugs to pass through the rib hole.

2. An aircraft wingbox assembly according to claim 1, wherein the rib hole and the fuel tank are configured to enable both of the first and second tank lugs to pass through the rib hole.

3. An aircraft wingbox assembly according to claim 1, wherein the fuel tank extends through the first one of the ribs and the second one of the ribs; a first part of the fuel tank is located in the first one of the bays; a second part of the fuel tank is located in a second one of the bays; and a third part of the fuel tank is located in a third one of the bays.

4. An aircraft wingbox assembly according to claim 3, wherein the tank wall extends continuously through the first, second and third ones of the bays.

5. An aircraft wingbox assembly according to claim 1, wherein each of the ribs comprises a rib web, and rib feet attaching the rib to the upper and lower covers; the first tank lug is attached to the rib web of the first one of the ribs or to a rib foot of the first one of the ribs; and the second tank lug is attached to the rib web of the second one of the ribs or to a rib foot of the second one of the ribs.

6. An aircraft wingbox assembly according to claim 1, wherein the first one of the ribs comprises a first rib lug; the second one of the ribs comprises a second rib lug; the first fastener attaches the first tank lug to the first rib lug; and the second fastener attaches the second tank lug to the second rib lug.

7. An aircraft wingbox assembly according to claim 1, wherein the first and second tank lugs are spaced apart along a length of the fuel tank, or the first and second tank lugs are spaced apart across a width of the fuel tank.

8. An aircraft wingbox assembly according to claim 1, wherein the fuel tank is a hydrogen fuel tank.

9. An aircraft wingbox assembly according to claim 1, wherein the fuel tank contains a fuel which is a pressurised gas or a cryogenically cooled liquid.

10. An aircraft wingbox assembly according to claim 1, wherein the first and second tank lugs are retractable.

11. An aircraft wingbox assembly according to claim 1, wherein the pair of spars extend in a spanwise direction; and the bays are spaced apart in the spanwise direction.

12. An aircraft wingbox assembly according to claim 1, wherein the fuel tank wall is rigid.

13. A method of assembling an aircraft wingbox assembly according to claim 1, the method comprising: installing the fuel tank so that at least part of the fuel tank is located in the first one of the bays; attaching the first one of the tank lugs to the first one of the ribs with the first fastener; and attaching the second one of the tank lugs to the second one of the ribs with the second fastener.

14. A method according to claim 13 wherein during the installing, the tank lugs are carried by the fuel tank wall.

15. A method according to claim 13, wherein during the installing, one or both of the tank lugs passes through the first one of the ribs and/or through the second one of the ribs.

16. A method according to claim 13, wherein during the installing, the fuel tank passes through the first one of the ribs and/or through the second one of the ribs.

17. A method according to claim 13, wherein the fuel tank has a length, and during the installing, the fuel tank is moved along its length, and then rotated or moved laterally to bring the tank lugs to fastening positions.

18. An aircraft wingbox assembly according to claim 1, wherein the first fastener is directly attaching the first tank lug to the first one of the ribs; and the second fastener is directly attaching the second tank lug to the second one of the ribs.

19. An aircraft wingbox assembly, comprising:
a wingbox comprising an upper cover, a lower cover and a pair of spars;
a plurality of ribs in the wingbox, wherein the plurality of ribs divide the wingbox into bays;
a fuel tank in the wingbox, wherein all or part of the fuel tank is located in a first one of the bays between a first one of the ribs and a second one of the ribs, the fuel tank comprising a tank wall and first and second tank lugs extending from the fuel tank wall; a first fastener attaching the first tank lug to the first one of the ribs;
a second fastener attaching the second tank lug to the second one of the ribs, and
wherein a lower half of the fuel tank carries the tank lugs and an upper half of the fuel tank is free of tank lugs and free of other attachment features.

* * * * *